United States Patent
Bera

(10) Patent No.: US 8,028,280 B2
(45) Date of Patent: *Sep. 27, 2011

(54) COMPILER OPTIMISATION OF SOURCE CODE BY DETERMINATION AND UTILIZATION OF THE EQUIVALENCE OF ALGEBRAIC EXPRESSIONS IN THE SOURCE CODE

(75) Inventor: Rajendra Kumar Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 768 days.

This patent is subject to a terminal disclaimer.

(21) Appl. No.: 12/015,591

(22) Filed: Jan. 17, 2008

(65) Prior Publication Data

US 2008/0127152 A1   May 29, 2008

Related U.S. Application Data

(63) Continuation of application No. 09/728,096, filed on Dec. 1, 2000, now Pat. No. 7,337,437.

(30) Foreign Application Priority Data

Dec. 1, 1999   (JP) .................................... 11-341591

(51) Int. Cl.
 *G06F 9/45* (2006.01)
(52) U.S. Cl. ....................... 717/141; 717/152
(58) Field of Classification Search .......... 717/140–143, 717/151–152
See application file for complete search history.

(56) References Cited

U.S. PATENT DOCUMENTS

| 3,621,209 A | 11/1971 | Businger |
| 4,692,896 A | 9/1987 | Sakoda et al. |
| 4,845,652 A | 7/1989 | Bunsen |
| 5,151,991 A | 9/1992 | Iwasawa et al. |
| 5,159,552 A | 10/1992 | van Gasteren et al. |
| 5,200,915 A | 4/1993 | Hayami et al. |
| 5,216,627 A | 6/1993 | McClellan et al. |
| 5,237,685 A | 8/1993 | Toney |

(Continued)

FOREIGN PATENT DOCUMENTS

JP   7244647   9/1995

(Continued)

OTHER PUBLICATIONS

Cmelik et al., Dimensional Analysis with C++. IEEE May 1988. pp. 21-27.

(Continued)

*Primary Examiner* — Ted T Vo
(74) *Attorney, Agent, or Firm* — Schmeiser, Olsen & Watts; John Pivnichny

(57) ABSTRACT

A computer program product and computer system for implementing a method of compiler optimisation of source code during compilation of the source code in a computer environment. The compiler optimisation of source code includes: recasting two algebraic expressions into a form of one or more token pairs arranged sequentially in a string, each token pair including an operator followed by an operand; reducing the strings in accordance with a set of predetermined simplifying rules; and comparing the reduced strings by matching to detect an equivalence of the two algebraic expressions.

8 Claims, 4 Drawing Sheets

U.S. PATENT DOCUMENTS

| | | | |
|---|---|---|---|
| 5,274,812 | A | 12/1993 | Inoue |
| 5,343,554 | A | 8/1994 | Koza et al. |
| 5,363,473 | A | 11/1994 | Stolfo et al. |
| 5,392,429 | A | 2/1995 | Agrawal et al. |
| 5,442,569 | A | 8/1995 | Osano |
| 5,481,723 | A | 1/1996 | Harris et al. |
| 5,666,533 | A | 9/1997 | Horiguchi et al. |
| 5,680,557 | A | 10/1997 | Karamchetty |
| 5,842,022 | A | 11/1998 | Nakahira et al. |
| 5,905,892 | A | 5/1999 | Nielsen et al. |
| 6,009,267 | A | 12/1999 | Ogawa |
| 6,026,235 | A | 2/2000 | Shaughnessy |
| 6,032,144 | A | 2/2000 | Srivastava et al. |
| 6,061,676 | A | 5/2000 | Srivastava et al. |
| 6,097,815 | A | 8/2000 | Shimada |
| 6,144,932 | A | 11/2000 | Hachiya |
| 6,182,284 | B1 | 1/2001 | Sreedhar et al. |
| 6,237,139 | B1 | 5/2001 | Hotta et al. |
| 6,282,704 | B1 | 8/2001 | Iitsuka |
| 6,286,135 | B1 | 9/2001 | Santhanam |
| 6,292,168 | B1 | 9/2001 | Venable et al. |
| 6,367,071 | B1 | 4/2002 | Cao et al. |
| 6,415,433 | B1 | 7/2002 | Callahan, II et al. |
| 6,427,234 | B1 | 7/2002 | Chambers et al. |
| 6,507,947 | B1 | 1/2003 | Schreiber et al. |
| 6,539,541 | B1 | 3/2003 | Geva |
| 6,578,196 | B1 | 6/2003 | Bera |
| 6,601,080 | B1 | 7/2003 | Garg |
| 6,654,953 | B1 | 11/2003 | Beaumont et al. |
| 6,708,331 | B1 | 3/2004 | Schwartz |
| 6,721,941 | B1 | 4/2004 | Morshed et al. |
| 6,738,967 | B1 | 5/2004 | Radigan |
| 6,745,215 | B2 | 6/2004 | Bera |
| 6,745,384 | B1 | 6/2004 | Biggerstaff |
| 6,826,585 | B2 | 11/2004 | Mitsunaga et al. |
| 6,948,161 | B2 | 9/2005 | Bera |
| 7,043,510 | B1 | 5/2006 | Bera |
| 7,076,777 | B2 | 7/2006 | Srinivasan |
| 7,089,545 | B2 | 8/2006 | Bera |
| 7,171,544 | B2 | 1/2007 | Bera |
| 7,337,437 | B2 | 2/2008 | Bera |
| 7,836,112 | B2 | 11/2010 | Bera |
| 2001/0003211 | A1 | 6/2001 | Bera |
| 2002/0007385 | A1 | 1/2002 | Stoutemyer |
| 2002/0016887 | A1 | 2/2002 | Scales |
| 2002/0178196 | A1 | 11/2002 | Monier |
| 2003/0018671 | A1 | 1/2003 | Bera |
| 2003/0056083 | A1 | 3/2003 | Bates et al. |
| 2003/0120900 | A1 | 6/2003 | Stotzer et al. |
| 2004/0019622 | A1 | 1/2004 | Elbe et al. |
| 2004/0158691 | A1 | 8/2004 | Redford |
| 2004/0220989 | A1 | 11/2004 | Elbe et al. |
| 2005/0028141 | A1 | 2/2005 | Kurhekar et al. |
| 2006/0015550 | A1 | 1/2006 | Bera |
| 2006/0036413 | A1 | 2/2006 | Campbell et al. |
| 2006/0041872 | A1 | 2/2006 | Poznanovic et al. |
| 2006/0080071 | A1 | 4/2006 | Bera |
| 2007/0169061 | A1 | 7/2007 | Bera et al. |

FOREIGN PATENT DOCUMENTS

| | | |
|---|---|---|
| JP | 11-110225 | 4/1999 |

OTHER PUBLICATIONS

Novak et al., Conversion of Units of Measurement. IEEE Transactions On Software Engineering, vol. 21, No. 8, Aug. 1995. pp. 651-661.

Rosen et al., Global Value Numbers and Redundant Computations; ACM, Jan. 1988. pp. 12-27.

Suganuma et al., Detection and Global Optimization of Reduction Operations for Distributed Parallel Machines; 1996, ACM. pp. 18-25.

Rauchwerger et al., The LRPD Test: Speculative Run-Time Parallelization of Loops with Privatization and Reduction Parallelization; IEEE Transactions on Parallel and Distributed Systems, vol. 10, No. 2, Feb. 1999. pp. 160-180.

Pottenger, W. M.; Induction Variable Substitution and Reduction Recognition in the Polaris Parallelizing Compiler, 1980. 70 pages.

Rauchwerger, L., Run-Time Parallelization: It's Time Has Come; Journal of Parallel Computing, Special Issue on Language and Compilers, vol. 24, No. 3-4, 1998, pp. 527-556.

Stoer et al., Introduction to Numerical Analysis, 1980, Springer-Verlag New York Heidelberg Berlin, pp. 97-102, 144-147, and 159-161.

Ledermann, W & Vajda, S., (EDS), Algebra, vol. 1 of Handbook of Applicable Mathematics, John Wiley & Sons, New York, 1980, Chapter 8.

Press, W. H., Teukolsky, S. A., Vetterling, W. T., Flannery, B. P., Numerical Recipes in Fortran, Second Edition, Cambridge University Press, 1992, Chapter 2.

Ralston, A., A First Course in Numerical Analysis, International Student Edition, McGraw-Hill, New York, 1965, Chapter 9.

Huang, Tsung-Chuan and Po-Hsueh Hsu, "A Practical run-time technique for exploiting loop-level parallelism." Journal of Systems and Software 54 (2000). pp. 259-271.

Huang, Tsung-Chuan and Cheng-Ming Yang, "Non-linear array data dependence test." Journal of Systems and Software 57 (2001). pp. 145-154.

Hwang, J. J. et al., "A New Access Control Method Using Prime Factorisation." The Computer Journal, vol. 35, No. 1, 1992. pp. 16-20.

Tanenbaum, Andrew S., Structured Computer Organization. Second Edition. Prentice-Hall, Inc. 1984. pp. 11-12 and 10.

Blume, W. et al., "The Range Test: A Dependence Test for Symbolic, Non-linear Expressions." IEEE 1994. pp. 528-537.

Koblitz, Neal, Algebraic Aspects of Cryptography. Springer: 1999. p. 28.

Huang et al., An Efficient Run-Time Scheme for Exploiting Parallelism on Multiprocessor Systems; M. Valero, V.K. Prasanna, and S. Vajapeyam (Eds,): HiPC2000, LNCS 1970, pp. 27-36 (2000).

Leon, Steven J., Linear Algebra with Applications, 1998, Prentice Hall, 5th edition, pp. 1-83.

COMPILER OPTIMISATION OF SOURCE CODE BY DETERMINATION AND UTILIZATION OF THE EQUIVALENCE OF ALGEBRAIC EXPRESSIONS IN THE SOURCE CODE

This application is a continuation application claiming priority to Ser. No. 09/728,096, filed Dec. 1, 2000 now U.S. Pat. No. 7,337,437.

TECHNICAL FIELD OF THE INVENTION

The present invention relates generally to transformation of algebraic expressions into a standard form, and in particular, to the equivalence of original and transformed expressions. The present invention relates to a method and apparatus for performing such transformation, and also to a computer program product including a computer readable medium having recorded thereon a computer program for performing such transformation.

BACKGROUND ART

Modern compiler initiated code optimisation techniques attempt to detect common sub-expressions and evaluate them only once, whenever such opportunities are possible to exploit. Most compilers manage to do this only in a limited sense, and this ability varies from compiler to compiler. For example, it is sometimes recommended that common sub-expressions be placed at the beginning of the expression and/or enclosed in parentheses, and that they be written in the same way each time they occur. This recommendation is based upon the fact that a compiler will generally not recognise the common sub-expression in such simple expression pairs as:

$T=U+X+Y$ and $V=(X+Y)+Z$ or $T=U+X+Y$ and $V=Z+X+Y$ or $T=U+X+Y$ and $V=X+Y+Z$

Many compilers do better if the same statements are organised in one of the following ways:

$T=X+Y+U$ and $V=X+Y+Z$ or $T=U+(X+Y)$ and $V=Z+(X+Y)$ or $T=U+(X+Y)$ and $V=X+Y+Z$ Naturally, if all computer programmers wrote their expressions in a universally recognised format and were consistent in their application of that format, then the task of the compiler would be simplified. However, human nature being what it is, this is an impossible aim. Furthermore, over time a given computer program will require modifications, corrections and the like to cope with changed external requirements, detected errors, and so on. Such changes will not always be written by the same programmer, and a later programmer may have only a rudimentary idea of the way the original (or former) programmer has expressed algebraically identical functions or rules. Thus, when the amended program comes to be recompiled, it is particularly advantageous if the compiler can recognise recently written expressions as being equivalent to earlier written expressions.

DISCLOSURE OF THE INVENTION

It is an object of the present invention to substantially overcome, or at least ameliorate, one or more disadvantages of existing arrangements.

According to a first aspect of the present invention there is disclosed a method of determining, in a computer environment, the equivalence, if any, of two algebraic expressions for use in compiler optimisation of source code and like computing tasks, said method comprising the steps of:

(a) recasting said expressions into a form of one or more token pairs arranged sequentially in a string, each said token pair comprising an operator followed by an operand;

(b) reducing said strings in accordance with a set of predetermined simplifying rules; and (c) comparing the reduced strings by matching, to detect equivalence of the two algebraic expressions.

According to another aspect of the invention, there is provided an apparatus adapted to determine, in a computer environment, the equivalence, if any, of two algebraic expressions for use in compiler optimisation of source code and like computing tasks, said apparatus comprising:

(a) recasting means for recasting said expressions into a form of one or more token pairs arranged sequentially in a string, each said token pair comprising an operator followed by an operand;

(b) reduction means for reducing said strings in accordance with a set of predetermined simplifying rules; and (c) comparison means for comparing the reduced strings by matching, to detect equivalence of the two algebraic expressions.

According to another aspect of the invention there is provided a computer program product including a computer readable medium having recorded thereon a computer program for determining, in a computer environment, the equivalence, if any, of two algebraic expressions for use in compiler optimisation of source code and like computing tasks, said program comprising:

(a) recasting process steps for recasting said expressions into a form of one or more token pairs arranged sequentially in a string, each said token pair comprising an operator followed by an operand;

(b) reduction process steps for reducing said strings in accordance with a set of predetermined simplifying rules; and (c) comparison process steps for comparing the reduced strings by matching, to detect equivalence of the two algebraic expressions.

The present invention relates to determining if two syntactically correct algebraic expressions are equivalent or not. Among its applications are compiler initiated optimisation of source code (where it is desirable to recognise multiple occurrences of invariant common sub-expressions in code blocks so that such sub-expressions can be evaluated once, and the result used in all the instances of the sub-expression in the block); simplification of algebraic expressions; etc.

BRIEF DESCRIPTION OF THE DRAWINGS

A preferred embodiment of the present invention will now be described with reference to the drawings, in which.

DETAILED DESCRIPTION INCLUDING BEST MODE

Figure 1:
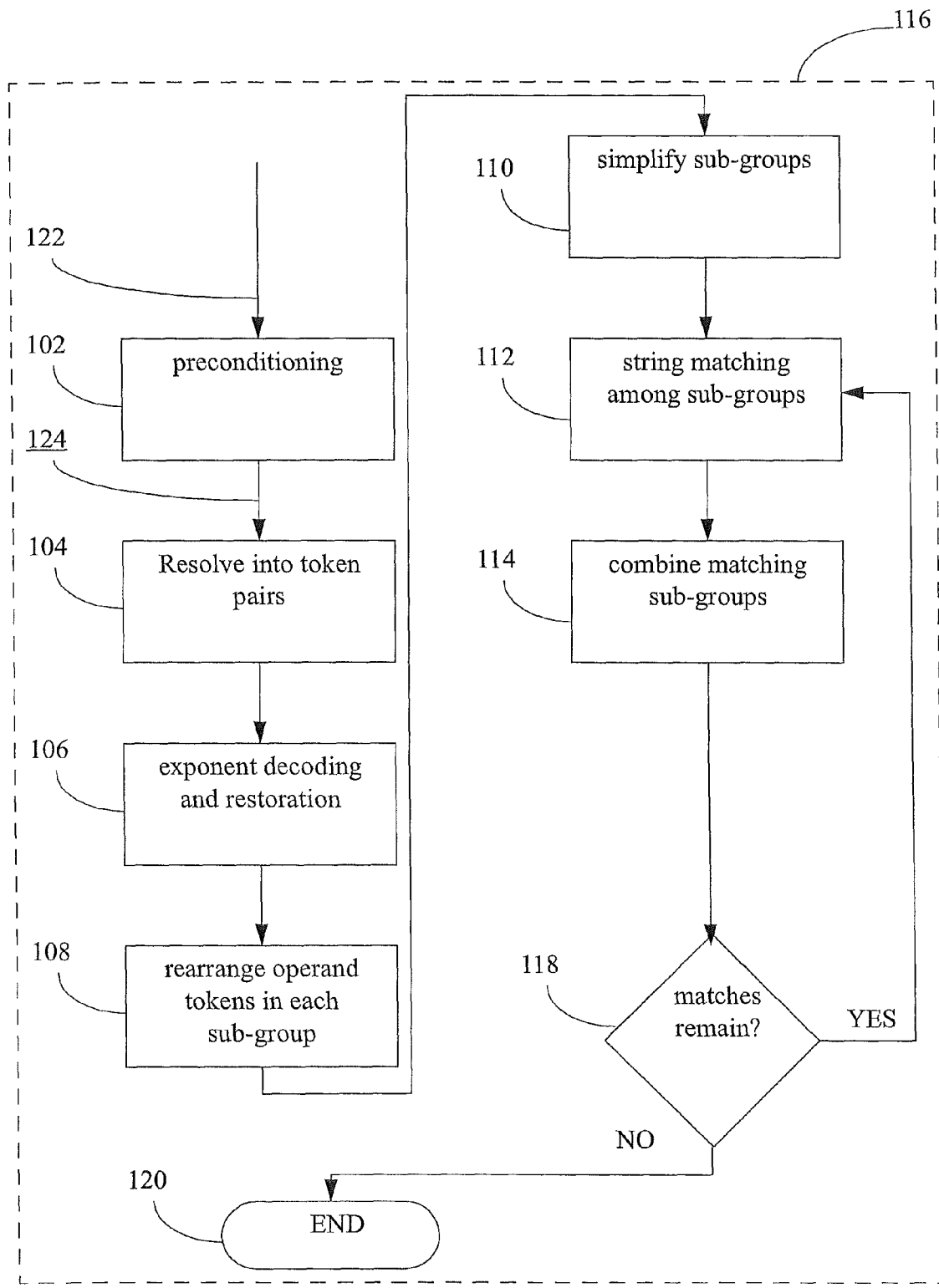
FIG. 1 shows a process flow diagram for a preferred embodiment of the present invention.

Where reference is made in any one or more of the accompanying drawings to steps and/or features, which have the same reference numerals, those steps and/or features have for the purposes of this description the same function(s) or operation(s), unless the contrary intention appears.

The principles of the preferred method described herein have general applicability to compilers, text editors, database management software, and the like. However, for ease of explanation, the steps of the preferred method are described with reference to algebraic expressions, and in particular, equivalence of such expressions. However, it is not intended that the present invention be limited to the described method.

FIG. 1 depicts an expression simplification process 116 illustrating a preferred embodiment of the present invention in which an algebraic expression is simplified through the mechanism of identifying, and eliminating, redundant equivalent sub-expressions. In the first instance, it is assumed that the algebraic expression input at 122 for testing and processing in regard to equivalence is syntactically (ie grammatically) correct.

A convention adopted for the present embodiment is that all variable names in an expression are composed of lower case characters only. In this context, the underscore is a reserved character used only by the embodiment to modify a variable's name. The use of the underscore is described in more detail with reference to FIG. 3, in particular in relation to handling variables raised to a negative power.

The syntactically correct expression is subjected to a pre-conditioning sub-process 102 which will be described in more detail in relation to FIG. 2. Thereafter, the preconditioned expression is resolved into token pairs in a token pair resolution sub-process 104. After the pre-conditioning sub-process 102, the resulting expression (or string) is conveniently termed a simple expression or simple string 402 (see FIG. 2 for a summary of terminology). This may be viewed as a succession of token pairs 404 —<operator><operand>—. A token pair 404 whose <operator> is a * is called a product token pair 406, and a token pair whose <operator> is + or − is called a sum token pair 408. A sum token pair and all its contiguously succeeding product token pairs are regarded as constituting a subgroup 410. Essentially the subgroups represent the terms in the simple algebraic expression, and the simple expression is a concatenation of the subgroups. The expression simplification process 116 is then directed to an exponent decoding and restoration sub-process 106 where exponents, having been coded in the pre-conditioning sub-process 102, are decoded and restored. Thereafter, operand tokens within each sub-group are rearranged in an operand rearrangement sub-process 108. The process 116 is then directed to a simplification sub-process 110. String matching among sub-groups is then performed in a string matching sub-process 112, after which the matching sub-groups are combined in a combination sub-process 114. Thereafter, the expression simplification process 116 is directed to a decision sub-process 118 which determines whether any matches remain to be performed. If they don't, then the process 116 is directed in accordance with the "NO" arrow to the end sub-process 120. If matches do still remain to be processed, then the process 116 is directed in accordance with the "YES" arrow back to the string matching sub-process 112, and so on.

Figure 2:
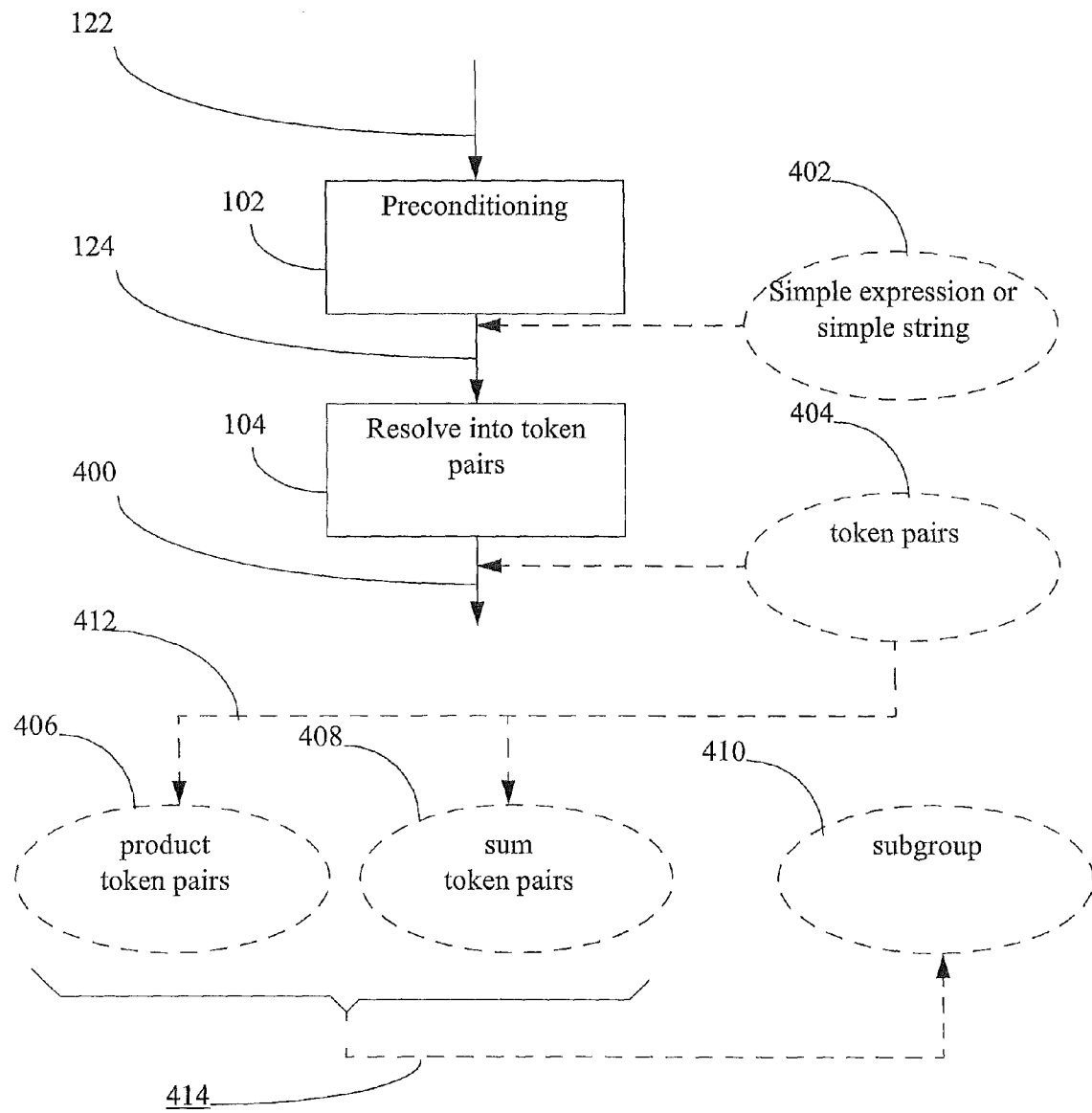
FIG. 2 depicts evolution of an algebraic expression during the process of FIG. 1.

FIG. 2 shows a partial evolution of the algebraic expression being simplified in the process 116 of FIG. 1, in particular, reviewing aspects of the terminology which is used. The output 124 of the preconditioning sub-process 102 is seen to comprise a simple expression or a simple string as depicted by a dashed inset 402. This simple expression 402, after passing through the token resolution sub-process 104, takes the form of token pairs 404. These pairs are either product token pairs 406, or alternatively sum token pairs 408. As noted above, a sum token pair 408 and all its contiguously succeeding product token pairs 406 are regarded as constituting a subgroup 410.

Figure 3:
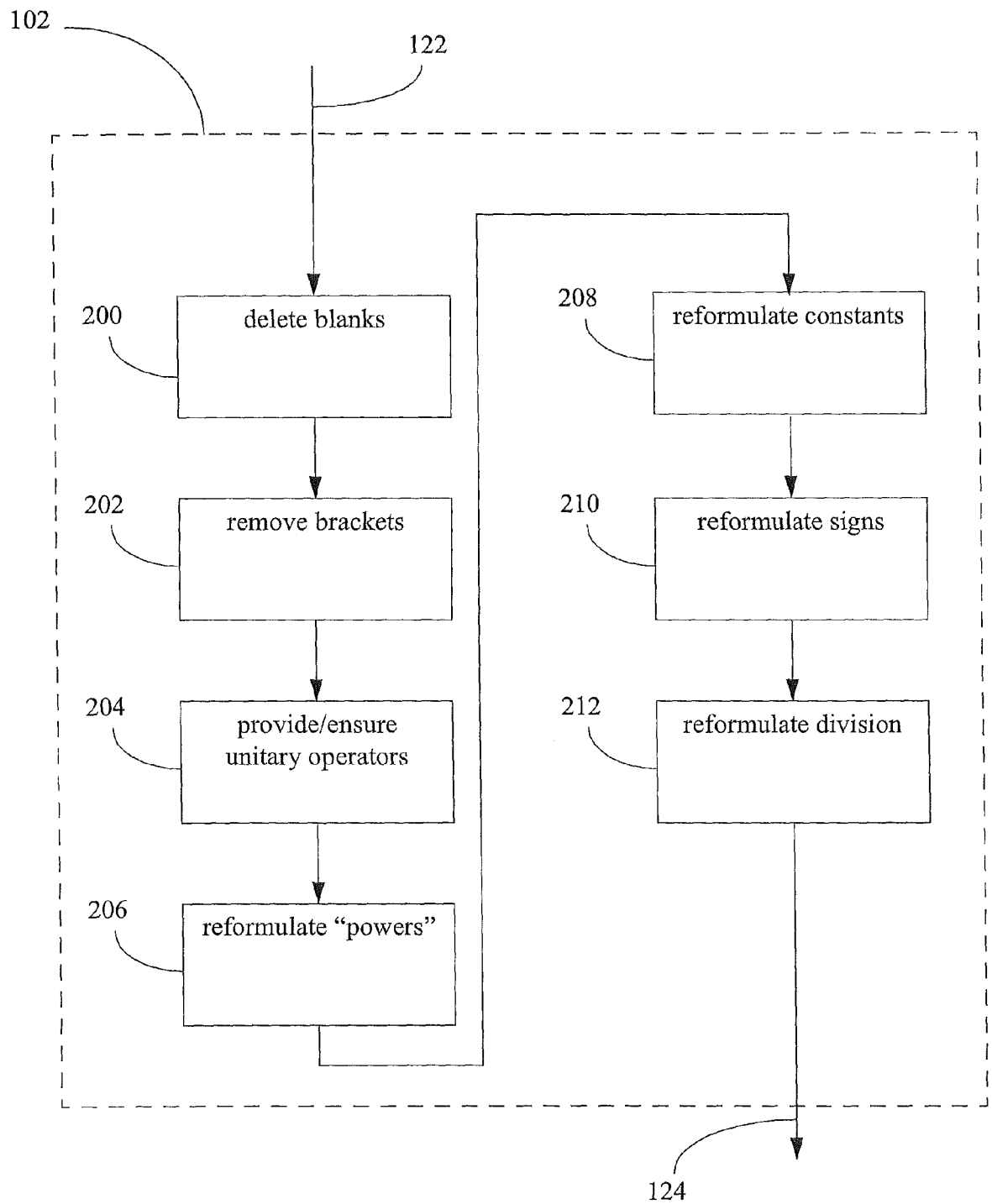
FIG. 3 shows the preconditioning sub-process in FIG. 1 in more detail.

Turning to FIG. 3, the preconditioning sub-process 102 is shown in more detail. Commencing with the incoming process flow depicted by an arrow 122, in a blank deletion sub-process 200, blanks (or spaces) in the expression, if found, are deleted. Thereafter, all brackets in the expression are removed in a bracket removal sub-process 202 by carrying out the necessary operations to enable the expression to be written without brackets, for example:

$a*(x-b)$ becomes $a*x-a*b$ and $(a+b))$ becomes $a+b$ etc.

Thereafter, in the event that an expression does not commence with a unitary operator, the unitary operator + (plus) is inserted at the start of the expression in a unitary operator sub-process 204. Thus, for example:

$a+b*c-d/f$ becomes $+a+b*c-d/f$

Variables raised to a positive integer power are written out as multiplications of the variable in the following power reformulation sub-process 206. Thus, for example:

$x^n$ becomes $x*x* \ldots *x$ [The variable x appearing n times]

Likewise, a variable x raised to a negative integer power is written out as multiplications of the variable $x\_$. Thus, for example:

$x^{-n}$ becomes $x\_*x\_* \ldots *x\_$ [$x\_$ appearing n times]

Note that $x\_$ is used as the variable name instead of x. For its significance, refer to the description for the division sub-process 212 below.

Fractional powers are handled by an appropriate function, such as the pow( ) in C and C++. For more detail in regard to the handling of functions, see the description relating to Handling of Aliases and Functions below.

At this point, the expression is then able to be written as a string in the following form:

<unitary operator><operand><operator><operand> . . . <operator><operand> where the unitary operator is either + (plus) or − (minus), and each operator is one of + (plus), − (minus), * (multiplication) or / (division).

It is noted that <unitary operator> is one of the unitary operators, which are operators which act on a single operand. The + and − operators are two such operators. Thus +a and −b are valid expressions, where a and b are operands. <operator> is one of the binary operators, which are operators which act on two operands. The +, −, *, / are such operators. Thus a+b, a*b are valid expressions. Note that the + and − operators act both as unitary and binary operators, their position in an expression making clear which role they are playing.

We need consider only unsigned constants since they are treated on par with the variables. The constants are represented by an exponential notation in an e-format in the following constant reformulation sub-process 208 as follows:

".[unsigned number]e[e-sign][unsigned exponent]"

where: [unsigned number] is a n-digited number comprising only digits and n is a prefixed integer greater than 0

[e-sign] is the sign of the exponent and is one of + (plus) or − (minus), but encoded respectively to > and < (one may choose other symbols for encoding provided they do not introduce ambiguity in the interpretation of the operators and operands in an expression)

[unsigned exponent] is a m-digited number comprising only digits and m is a prefixed integer greater than 0.

Note that there is a decimal point before the [unsigned number] and an e separating [unsigned number] and [e-sign]. In this format, all the constituent parts of a constant must be represented. Thus, for example:

$25 = 0.25 * 10^2$ becomes $.250000e{>}02$ and $0.025 = 0.25 * 10^{-1}$ becomes $.250000e{<}01$ where we have assumed n=6 and m=2. Note that any constant will be represented by a string of constant length m+n+3 characters in the e-format. Here e[e-sign][unsigned exponent] represents the quantity 10 raised to the power [e-sign][unsigned exponent], which must be multiplied to the number represented by .[unsigned number] to get the actual constant.

All + (plus) operators are then substituted, in a sign-reformulation sub-process 210 with the string +1* so that + becomes +1*. Similarly, all − (minus) operators are substituted with the string −1* so that − becomes −1*. (Actually, the is are encoded in their e-format.) Thus, for example:

a+b becomes $a+.100000e{>}01*b$ and a+b−c*d becomes $a+.100000e{>}01*b−.100000e{>}01*c*d$ Division by a constant (eg c) is then replaced in a division reformulation sub-process 212 by multiplication by the reciprocal (C=1/c) whilst division by a variable (eg x) is replaced by multiplication by the reciprocal of the variable (eg *x_ =1/x where x_ is the variable x suffixed by an underscore). Thus, for example:

y/c becomes y*c and a/x becomes a*x_

Once this preconditioning process 102 has been carried out, as noted previously, the resulting expression (or string) is conveniently termed a simple expression or simple string 402.

Returning to FIG. 1, the simple expression 402 can now be viewed, or resolved, in the token pair resolution sub-process 104 as a succession of token pairs 404 —<operator><operand>—beginning with the first operator token. The first operator token in the simple expression is guaranteed to be either + or −. A token pair whose <operator> is a * is called a product token pair 406, and a token pair whose <operator> is + or − is called a sum token pair 408. A sum token pair and all its contiguously succeeding product token pairs are regarded as constituting a subgroup 410. Note that in each subgroup the first operator will be either + or − and the remaining operators will be *. Essentially the subgroups represent the terms in the simple algebraic expression, and the simple expression is a concatenation of the subgroups.

Thereafter, in the exponent decoding/restoration sub-process 106, in all the operand tokens, which are constants, the exponent sign > or < is decoded and restored, respectively, to + or −. The operand tokens, including the tokens which hold constant operands, in each subgroup 410 are now rearranged in ascending order in the operand token rearrangement sub-process 108, with each operand token treated as a character string.

In respect of the ordering process, it is noted that in computers, characters are typically stored in ASCII (American Standard Code for Information Interchange) format. Each character in the ASCII character set (which contains numbers, alphabets, punctuation marks, etc. plus some non-printable characters) has a number associated with it. For example, the numerals 0 to 9 are, respectively, represented as numbers 48 to 57 in the ASCII set, the capital alphabets A to Z, respectively, by the numbers 65 to 90, the underscore by the number 95, the lower case alphabets a to z, respectively, by the numbers 97 to 122, the characters < and >, respectively, by the numbers 40 and 41, and so on. Typically, by default in computer programs, characters and character string operations are handled assuming all characters to be ASCII characters. The ordering of character strings in the present embodiment is performed according to the ASCII value of the characters in the string.

When strings comprising individual characters are to be ordered, the ordering can be performed in a straightforward manner having regard, individually, to the ASCII representation of each character. For example, given the list of variables "a, a, c, d, b" (having corresponding ASCII representations "97, 97, 99, 100, 98"), the ordered list takes the form "a, a, b, c, d" in accordance with an ascending order being imposed on the corresponding ASCII representations. When character strings to be ordered comprise multiple characters, ordering can be performed in a similar manner. Accordingly, (i) represent each variable eg "ab" as a concatenated ASCII representation "97|98" (the character | being used as a delimiter for the sake of this description only, ie, it is not used in the method itself) (ii) order the variables so that $1^{st}$ characters in the strings are in ascending order in accordance with their corresponding ASCII representations (iii) considering variables having a common first character, order the variables so that the $2^{nd}$ characters in the strings are in ascending order, (iv) considering variables having common first two characters, order the variables so that the $3^{rd}$ characters in the strings are in ascending order, . . . , and so on. Thus, for example, if the variables a, ab, a_, aa, ba (having corresponding ASCII representations 97, 97|98, 97|95, 97|97, 98|97) are sorted in ascending order, they will appear in the order a, a_, aa, ab, ba based on the ASCII value of the individual characters, ie 97, 97|95, 97|98, 98|97.

It is noted that "a" can be considered as "97" or "97|0". It is also noted that no other variable will be able to place itself between "a" and "a_" if a and a_ are present in the list of variables to be sorted.

In a further example, if the list of variables to be sorted are a, b, c, a, a, ba, a_, c, a_, then when this list is sorted in ascending order it will appear as a, a, a, a_, a_, b, ba, c, c.

When numbers are treated as character strings, such strings are also sorted according to the ASCII value of the characters appearing in the string. For example, the numbers .500000e+00 and .120000e+02, when sorted in ascending order will appear in the order .120000e+02, .500000e+00, even though as numbers they are in exactly the opposite order. This is because the character 1 has a lower ASCII number than the character 5. The reason that all the numbers bunch at the beginning of an expression when the operands are sorted is because all variable names are required to begin with an alphabet (ie an "alpha" as against a "numeric" or other character), and the ASCII value of all the alphabets is greater than those of the characters 0 to 9 and the character representing the decimal point (whose ASCII number is 46).

The naming of variables using only lowercase alphabets does not restrict the use of the process, because no matter what convention is used for naming a variable, the expression can be put through a preconditioning step so that the variables therein are mapped to a corresponding new set of variables which are constructed using only lower case alphabets. The method can then be executed on this preconditioned expression, and in the final result the variables are mapped back to their original names. Alternatively, one may retain the variable's name but replace the underscore by some other reserved character whose ASCII number is smaller than any of the permitted characters in a variable name provided its introduction does not create any semantic ambiguities.

Since all the operators, except the leading operator, are all * operators, which is a commutative operator, the rearrangement does not change the semantics of the subgroup. This is one of the reasons why the /x operator-operand pair was replaced with a contrived *x_ operator-operand pair.

In the simplification sub-process 110, advantage is taken of the rearrangement, by which the constant operand tokens will all bunch up at the beginning of the subgroup where they can be easily identified and replaced by a single constant. Also, in the rearrangement, a variable x and its counterpart reciprocal x_, if it is present, will appear as adjacent operands (ie x followed by x_) a situation which is easily identifiable. This pair (along with their corresponding * operators) can then be eliminated. (The underscore was deliberately used to bring about this ordering.)

Thus, for example:

+.100000e+01*a*w*b*a_*.500000e+00 after arranging the operand tokens in ascending order becomes

+.100000e+01*0.500000e+00*a*a_*b*w

Note the bunching of the constants and of the variables a and a_. After consolidating the constants and eliminating the variables a and a_ the previous expression becomes +.500000e+00*b*w Considering a further example, given the list of variables are a, b, c, a, a, ba, a_, c, a_, then when this list is sorted in ascending order it will appear as a, a, a, a_, a_, b, ba, c, c. Assuming for example that these variables represent the expression "+.100000e+00*a*a*a*a_*a_*b*ba*c*c", the simplification subprocess 110 handles it thus: it sees "a*a_" in the expression and therefore deletes it. The expression now becomes "+.100000e+00*a*a*a_*b*ba*c*c". It looks at the expression again and sees yet another "a*a_" and therefore deletes it. The expression now becomes "+.100000e+00*a*b*ba*c*c". No further simplification is possible in this example.

Continuing with the description in regard to FIG. 1, once the above operations are done, a string match is carried out in the string matching sub-process 112 among the subgroups. Thereafter, in the matching sub-group sub-process 114, all those subgroups, whose non-constant parts (that is, the third token onwards) match, are combined by modifying the constant operand in one of the instances of the subgroup, and eliminating all other instances of the subgroup.

Note that all subgroups will have their leading operator-operand pair representing a signed constant and no other operand token in a subgroup will be a constant. This was ensured when all the + operators in the expression were replaced with +1* and all the − operators in the expression were replaced with the string −1*. If a constant operand in a subgroup is zero, that subgroup is eliminated.

After the above described recombination/elimination, the rematch and recombination/elimination processes are repeated by virtue of the decision sub-process 118 until no rematch is found. Then no further simplification of the expression is possible in its present representation. This is the reduced form of the original algebraic expression string. The nature of the operations is such that any two algebraic expressions, which are equivalent, will reduce to the same unique reduced string. If the reduced string is equivalent to a zero, then the string is set to "0.0".

A string match between the respective reduced strings of two given algebraic expressions then suffices to determine if the said two algebraic expressions are equivalent or not.

Handling of Aliases and Functions

An aliased variable is a variable known by more than one name. It is analogous to a person being known by more than one name. In a computer program, all the different names of an aliased variable would refer to the same address in memory.

Accordingly, an aliased variable is easily handled by preparing a list of its aliases, alphabetically ordering the list and replacing all aliases with the name at the top of the ordered aliases list (since all variable names are assumed to comprise lower case alphabets, alphabetic ordering is, in this case, equivalent to ascending ordering). This replacement should be introduced as a part of the preconditioning process 102 described in relation to FIG. 2. It should preferably be the first preconditioning operation, but its position in the sequence of preconditioning operations is immaterial, It is possible to extend the expression simplification process 116 to include functions by replacing the function by the string funcname#, where funcname is a suitably contrived name designating the function name, its parameter types, and its actual arguments. This turns the function into a defacto variable name. The character # (one can choose some other) is appended to avoid possible collisions between a funcname and a variable name. One particular care has to be taken: each of the actual function arguments must be converted to their respective reduced expression before creating the funcname. This will ensure that the same function when it appears with an equivalent parameter list at different places will reduce to the same funcname. Thus, for example, sin(x) and sin(x+y/y−1) will return the same funcname. Thus, for example, sin(x) and sin(x+y/y−1) will return the same funcname since their respective arguments x and x+y/y−1 will both reduce to +.100000e+01*x.

The following example is given to illustrate the above described procedure. In the example, it is necessary to determine if:

x+y and y+4.0*x−x−x−y−x*a/a+2*y/2 are equivalent.

Consider the expression:

y+4.0*x−x−x−y−x*a/a+2*y/2

The following sequence of operations is carried out:
1. remove all blanks [A blank is the same as a space.]
2. insert a leading + operator,
3. change all constants to the coded e-format,
4. replace the +'s with +1* (ie +.100000e>01*), 5. replace the −'s with −1* (ie −.100000e>01*),
6. replace /a by *a_, and
7. replace /2 with *0.5 (ie *.500000e>00).
This results in +.100000e>01*y+.400000e>01*x−.100000e>01*
 x−.100000e>01*x−.100000e>01*
 y−.100000e>01*x*a*
 a_+.200000e>01*y*.500000e>00 where the exponent + sign has been encoded to > (< is used for the − sign). Next, the subgroups are formed, which are listed below:

+.100000e>01*y

+.400000e>01*x

−.100000e>01*x

−.100000e>01*x

−.100000e>01*y

−.100000e>01*x*a*a_

+.200000e>01*y*.500000e>00

In each of the subgroups we decode the exponent sign of the constants and sequence the operands in ascending order. The resulting subgroups are:

+.100000e+01*y

+.400000e+01*x

−.100000e+01*x

−.100000e+01*x

−.100000e+01*y

−.100000e+01*a*a_*x→−.100000e+01*x

+.200000e+01*.500000e+00*y→+.100000e+01*y

In the rearranged subgroups we consolidate the constants (as done in the last subgroup here) and eliminate all occurrences of the pattern *x*x_ (as done in the last but one subgroup where *a*a_ is eliminated). The subgroups are now arranged in ascending order, ie alphabetically, (neglecting their constant part) as follows:

+.400000e+01*x

−.100000e+01*x

−.100000e+01*x

−.100000e+01*x

+.100000e+01*y

−.100000e+01*y

+.100000e+01*y

Notice that the common subgroups have now bunched together, and a simple forward scan (from the third token onwards in the subgroups) allows them to be identified easily and consolidated leading to the final string.

+.100000e+01*x+.100000e+01*y

This is precisely the string we would have got for x+y.

The above described procedures enable algebraic expressions to be reduced to a unique form for easy comparison.

The foregoing describes only one embodiment of the present invention and modifications, obvious to those skilled in the art, can be made thereto without departing from the present invention.

Figure 4:
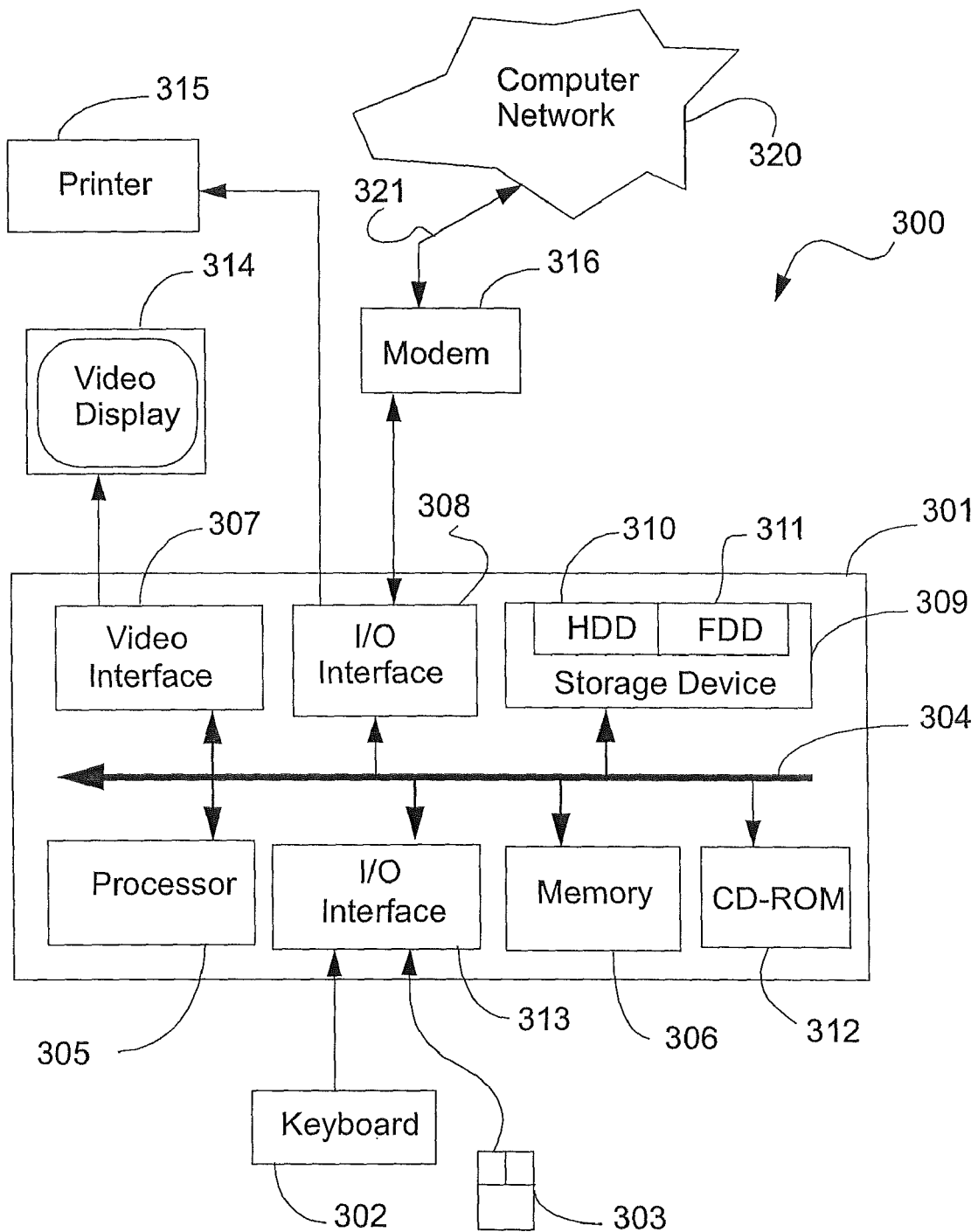
FIG. 4 is a schematic block diagram of a general purpose computer upon which the preferred embodiment of the present invention can be practiced.

The method of determining the equivalence of two algebraic expressions is preferably practiced using a conventional general-purpose computer system 300, such as that shown in FIG. 4 wherein the processes of FIGS. 1 and 3 may be implemented as software, such as an application program executing within the computer system 300. In particular, the steps of method of determining the equivalence of two algebraic expressions are effected by instructions in the software that are carried out by the computer. The software may be divided into two separate parts; one part for carrying out the determination of algebraic equivalence, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for determining the equivalence of two algebraic expressions in accordance with the embodiments of the invention.

The computer system 300 comprises a computer module 301, input devices such as a keyboard 302 and mouse 303, output devices including a printer 315 and a display device 314. A Modulator-Demodulator (Modem) transceiver device 316 is used by the computer module 301 for communicating to and from a communications network 320, for example connectable via a telephone line 321 or other functional medium. The modem 316 can be used to obtain access to the Internet, and other network systems, such as a Local Area Network (LAN) or a Wide Area Network (WAN).

The computer module 301 typically includes at least one processor unit 305, a memory unit 306, for example formed from semiconductor random access memory (RAM) and read only memory (ROM), input/output (I/O) interfaces including a video interface 307, and an I/O interface 313 for the keyboard 302 and mouse 303 and optionally a joystick (not illustrated), and an interface 308 for the modem 316. A storage device 309 is provided and typically includes a hard disk drive 310 and a floppy disk drive 311. A magnetic tape drive (not illustrated) may also be used. A CD-ROM drive 312 is typically provided as a non-volatile source of data. The components 305 to 313 of the computer module 301, typically communicate via an interconnected bus 304 and in a manner which results in a conventional mode of operation of the computer system 300 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 310 and read and controlled in its execution by the processor 305. Intermediate storage of the program and any data fetched from the network 320 may be accomplished using the semiconductor memory 306, possibly in concert with the hard disk drive 310. In some instances, the application program may be supplied to the user encoded on a CD-ROM or floppy disk and read via the corresponding drive 312 or 311, or alternatively may be read by the user from the network 320 via the modem device 316. Still further, the software can also be loaded into the computer system 300 from other computer readable medium including magnetic tape, a ROM or integrated circuit, a magneto-optical disk, a radio or infra-red transmission channel between the computer module 301 and another device, a computer readable card such as a PCMCIA card, and the Internet and Intranets including email transmissions and information recorded on websites and the like. The foregoing is merely exemplary of relevant computer readable mediums. Other computer readable mediums may be used without departing from the scope and spirit of the invention.

The method of determining the equivalence of two algebraic expressions may alternatively be implemented in dedicated hardware such as one or more integrated circuits performing the functions or sub functions of determining the equivalence of two algebraic expressions. Such dedicated hardware may include graphic processors, digital signal processors, or one or more microprocessors and associated memories.

INDUSTRIAL APPLICABILITY

It is apparent from the above that the embodiment(s) of the invention are applicable to the computer and data processing industries.

The foregoing describes only one embodiment of the present invention, and modifications and/or changes can be made thereto without departing from the scope and spirit of the invention, the embodiment being illustrative and not restrictive.

I claim:

1. A computer program product, comprising a computer readable storage medium having a computer readable program code embodied therein, said computer readable program code containing instructions that when executed by a processor of a computer system implement a method for performing compiler optimisation of source code during compilation of the source code in a computer environment by determining and utilizing the equivalence of two syntactically correct algebraic expressions comprised by the source code, said method comprising compiling the source code into object code, said compiling comprising determining the equivalence of the two algebraic expressions followed by eliminating a redundant algebraic expression of the two algebraic expressions determined to be equivalent, said determining the equivalence of the two algebraic expressions comprising the steps of:
   (a) recasting said expressions into a form of one or more token pairs arranged sequentially in a string, each said token pair comprising an operator followed by an operand;
   (b) reducing said strings in accordance with a set of predetermined simplifying rules;
   (c) comparing the reduced strings by matching, to detect equivalence of the two algebraic expressions;
   wherein said determining the equivalence of the two algebraic expressions comprises prior to the recasting step (a), in relation to said algebraic expressions, at least one of the following preconditioning sub-steps:
   (da) deleting a space in the expression;
   (db) removing a bracket in the expression by expanding a bracketed sub-expression;
   (dc) inserting a unitary operator at the start of the expression;
   (dd) recasting a power factor, being a variable being raised to a power in the expression, in an alternate form as one of:
      (dda) the power factor being expressed as the variable multiplied by itself as many times as the power, if the power is a positive integer;
      (ddb) the power factor being expressed as a reciprocal of the variable multiplied by itself as many times as an absolute value of the power, if the power is a negative integer;
      (ddc) the power factor being replaced by an appropriate function which can compute the power factor, if the power is not an integer;
   (de) recasting a constant in the expression in exponential format;
   (df) substituting a "+" operator in the expression by "+1*", a "1" being in exponential format;
   (dg) substituting a "−" operator in the expression by "−1*", a "1" being in exponential format; and
   (dh) recasting a "division by a constant" in the expression as multiplication by a reciprocal of the constant;
   wherein said reducing said strings in accordance with the set of predetermined simplifying rules in step (b) comprises:
   (ba) arranging token pairs into subgroups;
   (bb) arranging operand tokens in an arranged subgroup in order;
   (bc) reducing the ordered operands by consolidating one or more constants and eliminating variables of opposite effect to faun reduced subgroups; and
   (bd) consolidating one or more multiple instances of similar subgroups, to produce a reduced string.

2. The computer program product of claim 1, wherein said determining the equivalence of the two algebraic expressions comprises prior to the recasting step (a), in relation to said algebraic expressions, all of the preconditioning sub-steps.

3. The computer program product of claim 1, wherein an algebraic expression whose equivalence is to be determined contains an aliased variable, said determining the equivalence of the two algebraic expressions further comprising the steps of:
   arranging an ordered list of aliases of the variable, and substituting a first alias in the ordered list for all instances of the aliased variable in the expression, wherein said compiling comprises said arranging an ordered list of aliases of the variable and said substituting a first alias in the ordered list.

4. The computer program product of claim 1, wherein an algebraic expression whose equivalence is to be determined contains a function, said determining the equivalence of the two algebraic expressions further comprising the steps of:
   reducing function arguments using the set of predetermined simplifying rules; and replacing the function by a tagged string, said string designating a function name, parameter types, and arguments, wherein the tag distinguishes the function name from a variable, wherein said compiling comprises said reducing function arguments and said replacing the function by a tagged string.

5. A computer system comprising a processor and a computer readable memory unit coupled to the processor, said memory unit containing instructions that when executed by the processor implement a method for performing compiler optimisation of source code during compilation of the source code in a computer environment by determining and utilizing the equivalence of two syntactically correct algebraic expressions comprised by the source code, said method comprising compiling the source code into object code, said compiling comprising determining the equivalence of the two algebraic expressions followed by eliminating a redundant algebraic expression of the two algebraic expressions determined to be equivalent, said determining the equivalence of the two algebraic expressions comprising the steps of:

(a) recasting said expressions into a form of one or more token pairs arranged sequentially in a string, each said token pair comprising an operator followed by an operand;
(b) reducing said strings in accordance with a set of predetermined simplifying rules;
(c) comparing the reduced strings by matching, to detect equivalence of the two algebraic expressions;
wherein said determining the equivalence of the two algebraic expressions comprises prior to the recasting step (a), in relation to said algebraic expressions, at least one of the following preconditioning sub-steps:
(da) deleting a space in the expression;
(db) removing a bracket in the expression by expanding a bracketed sub-expression;
(dc) inserting a unitary operator at the start of the expression;
(dd) recasting a power factor, being a variable being raised to a power in the expression, in an alternate form as one of:
  (dda) the power factor being expressed as the variable multiplied by itself as many times as the power, if the power is a positive integer;
  (ddb) the power factor being expressed as a reciprocal of the variable multiplied by itself as many times as an absolute value of the power, if the power is a negative integer;
  (ddc) the power factor being replaced by an appropriate function which can compute the power factor, if the power is not an integer;
(de) recasting a constant in the expression in exponential format;
(df) substituting a "+" operator in the expression by "+1*", a "1" being in exponential format;
(dg) substituting a "−" operator in the expression by "−1*", a "1" being in exponential format; and
(dh) recasting a "division by a constant" in the expression as multiplication by a reciprocal of the constant;

wherein said reducing said strings in accordance with the set of predetermined simplifying rules in step (b) comprises:
(ba) arranging token pairs into subgroups;
(bb) arranging operand tokens in an arranged subgroup in order;
(bc) reducing the ordered operands by consolidating one or more constants and eliminating variables of opposite effect to form reduced subgroups; and
(bd) consolidating one or more multiple instances of similar subgroups, to produce a reduced string.

6. The computer system of claim 5, wherein said determining the equivalence of the two algebraic expressions comprises prior to the recasting step (a), in relation to said algebraic expressions, all of the preconditioning sub-steps.

7. The computer system of claim 5, wherein an algebraic expression whose equivalence is to be determined contains an aliased variable, said determining the equivalence of the two algebraic expressions further comprising the steps of:
arranging an ordered list of aliases of the variable, and substituting a first alias in the ordered list for all instances of the aliased variable in the expression, wherein said compiling comprises said arranging an ordered list of aliases of the variable and said substituting a first alias in the ordered list.

8. The computer system of claim 5, wherein an algebraic expression whose equivalence is to be determined contains a function, said determining the equivalence of the two algebraic expressions further comprising the steps of:
reducing function arguments using the set of predetermined simplifying rules; and
replacing the function by a tagged string, said string designating a function name, parameter types, and arguments, wherein the tag distinguishes the function name from a variable, wherein said compiling comprises said reducing function arguments and said replacing the function by a tagged string.

* * * * *